United States Patent
Lee et al.

(10) Patent No.: US 10,268,732 B2
(45) Date of Patent: Apr. 23, 2019

(54) RANKING NATIVE APPLICATIONS AND NATIVE APPLICATION DEEP LINKS

(71) Applicant: Google LLC, Mountain View, CA (US)

(72) Inventors: Dong Ha Lee, Palo Alto, CA (US); Jaehyun Yeom, Mountain View, CA (US)

(73) Assignee: Google LLC, Mountain View, CA (US)

(*) Notice: Subject to any disclaimer, the term of this patent is extended or adjusted under 35 U.S.C. 154(b) by 477 days.

(21) Appl. No.: 14/753,350

(22) Filed: Jun. 29, 2015

(65) Prior Publication Data

US 2016/0378761 A1 Dec. 29, 2016

(51) Int. Cl.
*G06F 17/30* (2006.01)

(52) U.S. Cl.
CPC .... *G06F 17/3053* (2013.01); *G06F 17/30554* (2013.01); *G06F 17/30864* (2013.01); *G06F 17/30867* (2013.01); *G06F 17/30899* (2013.01)

(58) Field of Classification Search
None
See application file for complete search history.

(56) References Cited

U.S. PATENT DOCUMENTS

| | | | |
|---|---|---|---|
| 7,219,090 B2 | 5/2007 | Travis | |
| 7,725,453 B1 | 5/2010 | Chen | |
| 8,209,615 B2 | 6/2012 | Gupta | |
| 8,635,212 B1* | 1/2014 | Bunn | G06F 17/30867 |
| | | | 707/706 |
| 8,768,913 B2 | 7/2014 | Copperman | |
| 2005/0080795 A1* | 4/2005 | Kapur | G06F 17/30705 |
| 2006/0235780 A1* | 10/2006 | Carney | G06Q 40/06 |
| | | | 705/35 |
| 2013/0238613 A1 | 9/2013 | Hu | |
| 2013/0290319 A1 | 10/2013 | Glover | |
| 2013/0304729 A1 | 11/2013 | Jiang | |
| 2014/0172840 A1 | 6/2014 | Kumar | |

(Continued)

OTHER PUBLICATIONS

Nirav Savjani, Deep linking & search in iOS 9 will change everything, Jun. 10, 2015, https://medium.com/ios-os-x-development/deep-linking-search-in-ios-9-will-change-everything-feab0bb7e189.*

(Continued)

*Primary Examiner* — Syling Yen
*Assistant Examiner* — Tony Wu
(74) *Attorney, Agent, or Firm* — Fish & Richardson P.C.

(57) ABSTRACT

Methods, systems, and apparatus, including computer programs encoded on a computer storage medium, for ranking native applications. In one aspect, a method includes determining, for a given query, a first ranking of a set of first native applications that each have a respective corresponding web resource. For each particular first native application in the first ranking, a first universal ranking score is determined based on a position of the particular first native application in the first ranking and a total number of first native applications in the first ranking. A second ranking of a set of second native applications that do not have a corresponding web resource is determined. For each particular second native application, a second universal ranking score is determined based on a position of the particular second native application in the second ranking and a total number of second native applications in the second ranking.

20 Claims, 4 Drawing Sheets

(56) References Cited

U.S. PATENT DOCUMENTS

| | | | |
|---|---|---|---|
| 2014/0250147 A1* | 9/2014 | Shapira | G06F 17/30864 |
| | | | 707/770 |
| 2014/0317073 A1 | 10/2014 | Jain | |
| 2015/0227588 A1* | 8/2015 | Shapira | G06F 17/30675 |
| | | | 707/722 |
| 2016/0162574 A1* | 6/2016 | Gorodilov | G06Q 10/10 |
| | | | 707/722 |

OTHER PUBLICATIONS

Chris Maddern, A brief history of deep linking, Jun. 12, 2015, https://techcrunch.com/2015/06/12/a-brief-history-of-deep-linking/.*

Dave Parrack: "4 Search Engines That Combine Google & Bing", Mar. 2, 2013, pp. 1-7, XP055294916, retrieved from the Internet: URL:http://web.archive.org/web/20130302222312/http://www.makeuseof.com/tag/4-search-engines-that-combine-google-bing [retrieved on Aug. 11, 2016].

International Search Report and Written Opinion in International Application No. PCT/US2016/038376, dated Oct. 25, 2016, 12 pages.

\* cited by examiner

RANKING NATIVE APPLICATIONS AND NATIVE APPLICATION DEEP LINKS

BACKGROUND

The Internet provides access to a wide variety of information. For example, digital image files, video and/or audio files, as well as web page resources for particular subjects or particular news articles, are accessible over the Internet. With respect to web page resources, many of these resources are designed to facilitate the performing of particular functions, such as banking, booking hotel reservations, shopping, etc., or to provide structured information, such as on-line encyclopedias, movie databases, etc.

A variety of search engines are available for identifying particular web page resources accessible over the Internet. With the advent of tablet computers and smart phones, native applications that facilitate the performance of the same functions facilitated by the use of web page resources are now being provided in large numbers. Furthermore, many of these native applications also provide content that is not otherwise provided by web page resources, e.g., some native applications provide content that is only served by those native applications and there is no web-based counterpart.

A user's informational need may be satisfied by providing search results that identify either one (or both) of a particular web page resource or a native applications that facilitates the performance of the same functions facilitated by web page resource, or presents the same or very similar information as the web page resource. However, a user may also have an interest in native applications that do not have counterpart web page resources. The scoring of these two types of native applications may use different scoring signals, however, and thus the resulting relevance scores for a search query may not consistently convey to a user the corresponding relevance of the content of the deep-linked content for each native application type.

SUMMARY

This specification describes technologies relating to ranking search results for native applications (e.g., mobile apps).

In general, one innovative aspect of the subject matter described in this specification can be embodied in methods that include the actions of determining, for a given query, a first ranking of a set of first native applications that each have a respective corresponding web resource and that are relevant to the given query; determining, for each particular first native application in the first ranking, a first universal ranking score based on a position of the particular first native application in the first ranking and a total number of first native applications in the first ranking; determining, for the given query, a second ranking of a set of second native applications that do not have a corresponding web resource and that are relevant to the given query; determining, for each particular second native application, a second universal ranking score based on a position of the particular second native application in the second ranking and a total number of second native applications in the second ranking; determining a combined ranking of the first native applications and the second native applications based on the first universal ranking scores and the second universal ranking scores; and providing data that causes presentation of search results for at least a portion of the first native applications and the second native applications in an order based on the combined ranking. Other embodiments of this aspect include corresponding systems, apparatus, and computer programs, configured to perform the actions of the methods, encoded on computer storage devices.

These and other embodiments can each optionally include one or more of the following features. In some aspects, determining the first universal ranking score for a particular first native application includes determining a first value based on a difference between the total number of first native applications in the first ranking and the position of the particular first native application in the first ranking and determining a ratio between (i) a sum of the first value and a second value and (ii) the total number of first native applications in the first ranking. The second value may be approximately one.

In some aspects, determining the first universal ranking score for a particular first native application includes identifying, for the particular first native application, a Fibonacci number that corresponds to the position of the particular first native application in the first ranking and determining an inverse of the Fibonacci number for the particular first native application. Determining the first universal ranking score for a particular first native application can include identifying, for each first native application in the first ranking, a Fibonacci number that corresponds to the position of the first native application in the first ranking; determining, for each first native application in the first ranking, an inverse of the Fibonacci number that corresponds to the position of the first native application in the first ranking; determining a sum of the inverse for each first native application in the first ranking; and determining a ratio between (i) the inverse of the Fibonacci number for the particular first native application and (ii) the sum of the inverse for each first native application in the first ranking.

Some aspects include identifying, based on the given query, the first native application from a first search index that includes data that identify native applications that have a corresponding web page, each first native application being ranked based on data regarding the web page that corresponds to the first native application. Some aspects include identifying, based on the given query, the second native applications from a second search index that includes data that identify native applications that do not have a corresponding web page, each second native application being ranked based on content of the second native application.

In some aspects, the first ranking includes at least one web resource that is relevant to the given query. In some aspects, the first ranking of the set of first native applications includes one or more content pages of one or more of the first applications. In some aspects, the second ranking of the set of second native applications includes one or more content pages of one or more of the second native applications.

Particular embodiments of the subject matter described in this specification can be implemented so as to realize one or more of the following advantages. Search results that include a link to a particular location within a native application (e.g., a mobile app) can be ranked with other search results (e.g., search results to web pages) such that the more relevant resources (app or web page) are ranked higher. This inclusion of search results that link to locations within applications provide additional search result options that may better satisfy the users' informational needs.

Multiple search result rankings, each for a different type of resource or for native applications having differing amounts of corresponding web resources, can be merged into a combined ranking while preserving the ranking in each of the multiple rankings. For example, native applications that do not have a corresponding web page and/or content pages for the native applications may be ranked separate from other resources and native applications that do have a corresponding web pages, and the two rankings can be merged while preserving the individual rankings. This allows for native applications that have a corresponding web page to be ranked based on criteria different from criteria for native applications that do not have a corresponding web page. The use of a universal score for the native applications in each ranking allows for such a merge without the use of normalization.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
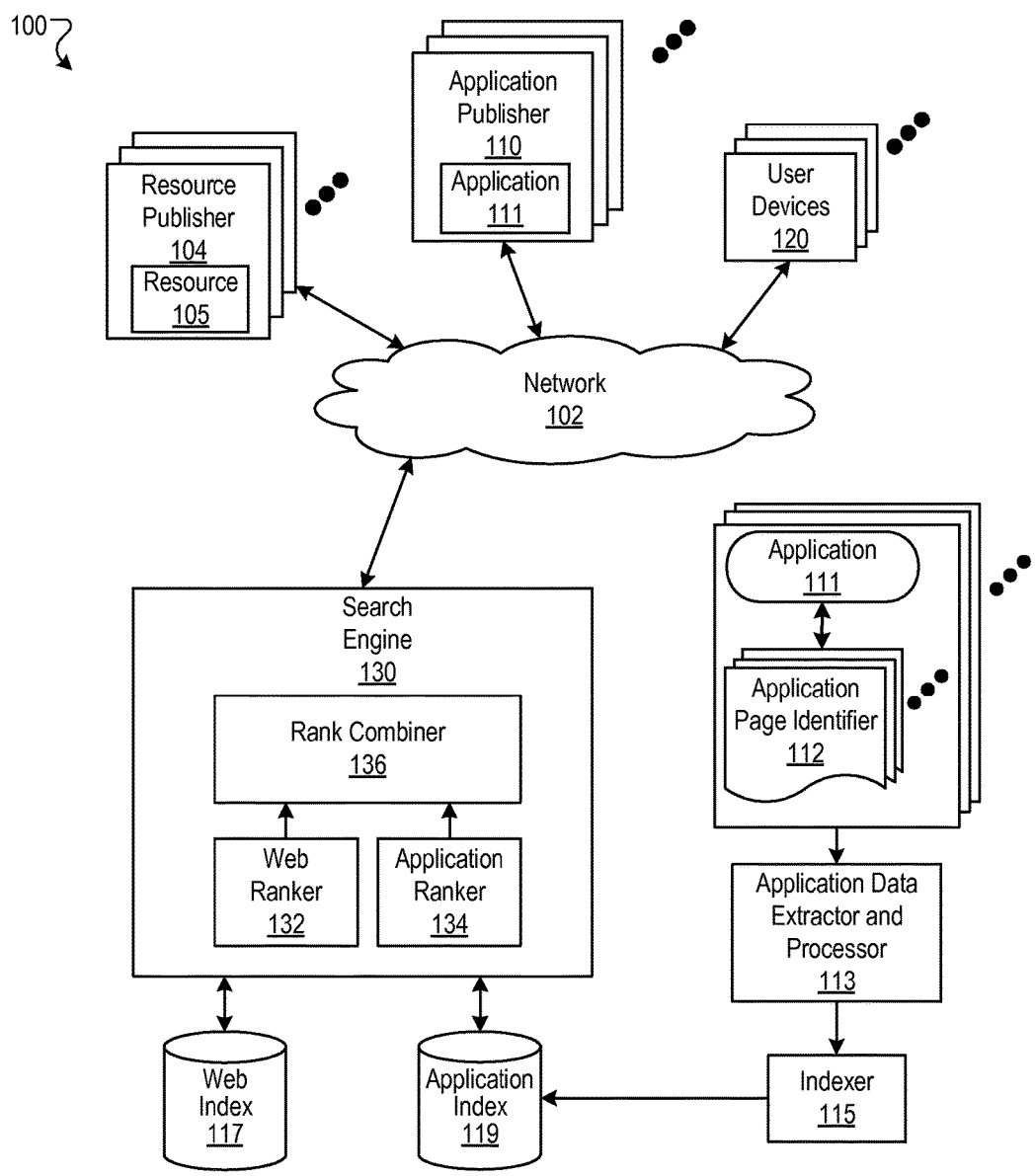
FIG. 1 is a block diagram of an example environment in which native applications and their content are indexed and searched.

A system ranks, for inclusion in search results for queries, native applications that do not have a corresponding web page with native applications that have a corresponding web page and/or with web resources (e.g., web pages). A used here, a "native application", which may also be referred to as an "app," is an application that runs on a user device and that operates independent of a browser application on the user device. In particular, a native application is an application specifically designed to run on a particular user device operating system and machine firmware. Native applications differ from browser-based applications and browser-rendered resources. The latter require all, or at least some, elements or instructions downloaded from a web server each time they are instantiated or rendered. Furthermore, browser-based applications and browser-rendered resources can be processed by all web-capable mobile devices within the browser and thus are not operating system specific.

A search result for a native application that does not have a corresponding web page is referred to herein as an app-only search result. A search result for a native application, whether the native application does or does not have corresponding web page resources, can include a link to a particular location within the application. Such a link is referred to as a "deeplink."

The system can rank native applications (and/or application pages of the native applications) that do not have a corresponding web resource separate from a ranking for native applications (and/or application pages of the native applications) that have a corresponding web resource, and other resources. In this way, the ranking for web resources and native applications that have corresponding web resources can be ranked based on data that may be unavailable for native applications that do not have a corresponding web page. With respect to the ranked native applications having corresponding web resources and ranked native applications that do not have corresponding web resources, the system can merge the two or more rankings to generate a combined ranking. The system can merge the rankings such that the ranking of native applications/resources in each individual ranking is preserved in the combined ranking. For example, if a first application is ranked higher than a second application in an app-only search result ranking, then the first application may also be ranked higher than the second application in the combined ranking.

To combine the multiple rankings, the system can determine a universal ranking score for each native application (and/or for application pages of the native application) and, optionally, each web resource in each ranking. The universal ranking score for a particular native application/web resource/application page may be based on (i) the native application/resource/application page position in the ranking in which the native application/web resource/application page is ranked and the number of native applications/web resources/application pages in that ranking. For example, the universal score for a particular native application, web resource, or application page may be based on $(n-k+1)/n$, where "n" is the number of native applications, web resources, and/or application pages in the ranking and "k" is the position of the particular native application, web resource, or application page being scored. The number "n" may be a fixed number, e.g., 100, or may be the number of native applications/web resources/application pages having a score that meets a threshold value.

In another example, the universal score for a particular native application, web resource, or application page may be based on the inverse of a Fibonacci number that corresponds to the rank position of the particular native application, web resource, or application page and the number of native applications, web resources, and/or application pages in the ranking. The native applications, web resources, and/or application pages from the multiple rankings can then be ranked based on their respective universal ranking scores.

Operation of the system that ranks app-only search results with other search results is described in more detail below.

FIG. 1 is a block diagram of an example environment 100 in which native applications and their content are indexed and searched. A computer network 102, such as the Internet, connects resource publisher websites 104, application publisher websites 110, user devices 120 and a search engine 130.

A resource publisher website 104 includes one or more web resources 105 associated with a domain and hosted by one or more servers in one or more locations. Generally, a resource publisher website is a collection of web pages formatted in hypertext markup language (HTML) that can contain text, images, multimedia content, and programming elements. Each website 104 is maintained by a content publisher, which is an entity that controls, manages and/or owns the website 104.

A web page resource is any data that can be provided by a publisher website 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts.

An application publisher website 110 may also include one or more web resources 105, and also provides native applications 111. A native application 111 is an application specifically designed to run on a particular user device operating system and machine firmware. Native applications 111 may include multiple versions designed to run on different platforms. For example, native applications corresponding to a movie database website may include a first native application that runs on a first type of smart phone, a second native application that runs on a second type of smart phone different from the first type, a third native application that runs on a first type of tablet, etc.

As used in this specification, an "application page" or "environment instance" is a particular display environment within a native application and in which is displayed content, such as text, images, and the like. An application page is specific to the particular native application, and the native application is specific to the particular operating system of the user device 120. An application page differs from a rendered web resource in that the application page is generated within and specific to the native application, while a web resource may be rendered in any browser for which the web page resource is compatible, and is independent of the operating system of the user device.

A native application may or may not have a corresponding web resource (e.g., web page or publisher website). For example, a news reader native application may have a corresponding website at which the same news content is served. Conversely, a fitness native application may not have a corresponding website that serves the content that is served by the fitness native application.

A user device 120 is an electronic device that is under the control of a user. A user device 120 is typically capable of requesting and receiving web page resources 105 and native applications 111 over the network 102. Example user devices 120 include personal computers, mobile communication devices, and tablet computers.

To search the web resources 105 and the native applications 111, the search engine 130 accesses a web index 117 and an application index 119. The web index 117 is an index of web resources 105 that has, for example, been built from crawling the publisher websites 104. In some implementations, the web index 117 also includes an index of native applications that have corresponding web resources 105. The application index 119 is an index of native applications 111 that do not have corresponding web resources and/or application pages or other application content for native applications 111 that do not have corresponding web resources. In some implementations, an application page that does not have a corresponding web page that includes the same content as the application page may be included in the application index 119 independent of whether the native application that includes the application page has a corresponding web resource. The application index 119 may be constructed using an application data extractor and processor 113 and an indexer 115. Although shown as separate indexes, the web index 117 and the application index 119 can be combined in a single index in which the web index 117 and the application index 119 are separately searchable.

The application data extractor and processor 113 can obtain application package files for native applications for one or more different platforms. The application data extractor and processor 113 can decompress and interpret the application package files. The indexer 115 can crawl the decompressed application files and index the applications based on the crawled content. For example, the indexer 115 may identify text included in the decompressed file that represents particular application pages. The indexer 115 can then include an entry in the application index 119 (or the web index 117) for each native application 111 and/or each application page for each native application 111. The entry for an application 111 or application page may include text that is representative of the native application or application page found using the crawling process. The entry for each application page can also include an application page identifier 112 that uniquely identifies the application page.

A native application and/or its application pages can be indexed in the web index 117 if the native application or its application pages have a corresponding web resource (e.g., web page). For example, if the application publisher website 110 has a web page that includes the same or similar content as the application page, then the indexer 115 may index the application page in the web index 117 rather than the application index 119. In this way, the application page can be ranked with other web resources based on content from the application page and its corresponding web resource. If a native application or its application pages do not have a corresponding web resource, the native application and/or its application pages can be indexed in the application index 119. In this way, the native applications and application pages that do not have a corresponding web resource can be ranked based on different criteria from the criteria used to rank web resources and native applications that do have corresponding web resources and their respective application pages. For example, the native applications and applications pages in the application index 119 may be ranked based on their respective content and/or other data regarding the native application and application pages independent of web resource data.

The user devices 120 submit queries to the search engine 130. In response to each query, the search engine 130 accesses the web index 117 and the application index 119 to identify resources and applications, respectively that are relevant to the query. The search engine 130 includes a web ranker engine 132 that ranks web resources, native applications having a corresponding web resource, and/or application pages of native applications that have a corresponding resource. The search engine 130 also includes an application ranker engine 134 that ranks native applications that do not have a corresponding web page and/or application pages of native applications that do not have a corresponding web page. A variety of appropriate search engine algorithms can be used to implement the web ranker 132. Operation of the application ranker engine 134 is described in more detail with reference to FIGS. 2 and 3 below.

The search engine 130 utilizes a rank combiner 136 that combines or merges the rankings output by the resource ranker engine 132 and the application ranker engine 134 into a combined ranking. The rank combiner 136 can combine the rankings in such a way that the relative individual rankings are preserved in the combined ranking. In some implementations, the rank combiner 136 determines a universal ranking score for each ranked native application, web resource, and/or application page based on a position of the native application, resource, or application page in its ranking and the total number of applications, web resources, and/or application pages in the ranking. The rank combiner 136 can rank the native applications, web resources, and/or application pages based on the universal ranking scores. Operation of the rank combiner 136 and example processes for combining multiple rankings are described in more detail below with reference to FIGS. 2 and 3 below.

The search engine 130 generates web resource search results for the web resources and native application search results for the native applications and application pages. Once generated, the search engine 130 provides the search results to the user device 108 from which the query was received.

A web resource search result is data generated by the search engine 130 that identifies a web resource and provides information that satisfies a particular search query. A web resource search result for a resource can include a web page title, a snippet of text extracted from the resource, and a resource locator for the resource, e.g., the URL of a web page. A native application search result specifies a native application. A variety of functions can be invoked by the selection of an application search result. For example, selection of a native application search result may cause the native application to launch (if installed on the user device 110) and generate an instance of application page referenced in the application search result and that includes content that is relevant to the search query. Such a function is referred to as "deep linking" within the application search result.

Figure 2:
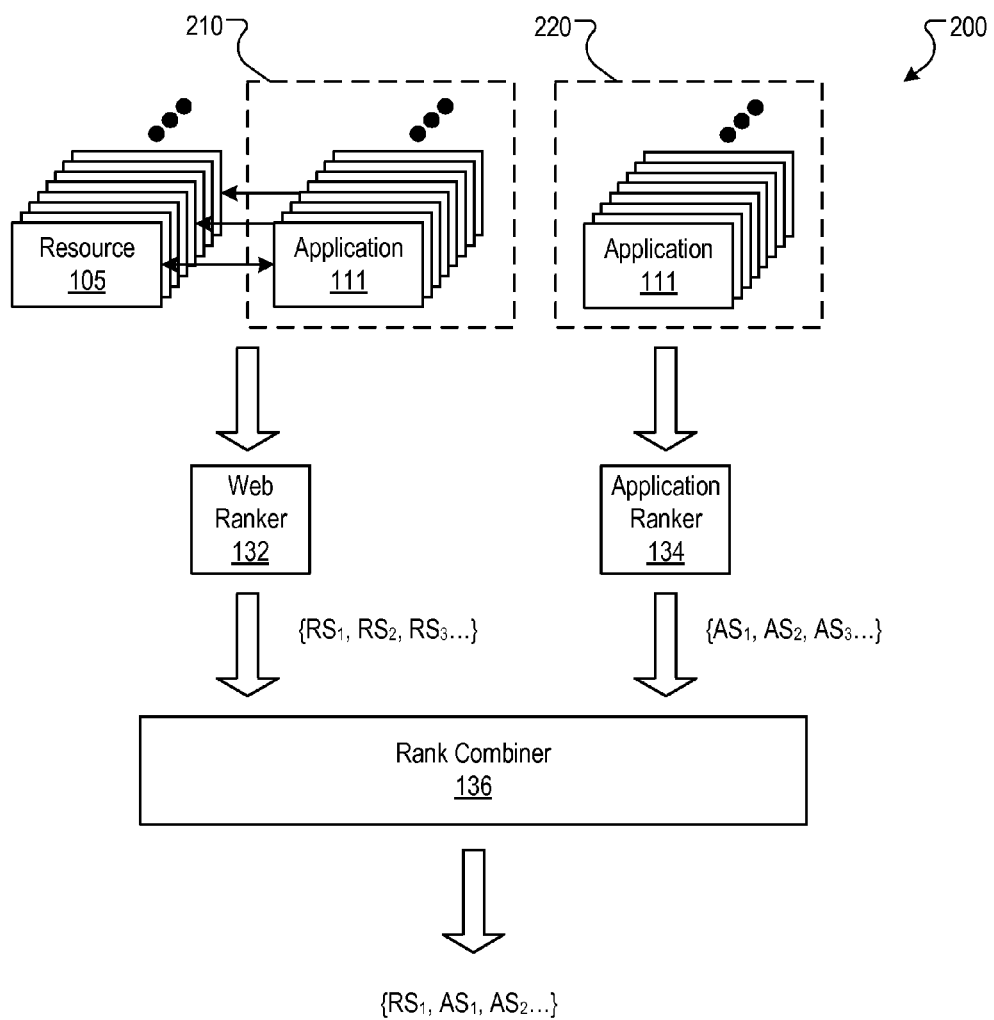
FIG. 2 is a system flow diagram of ranking native applications that do not have corresponding web resources with web resources and native applications that do have corresponding web resources.
Figure 3:
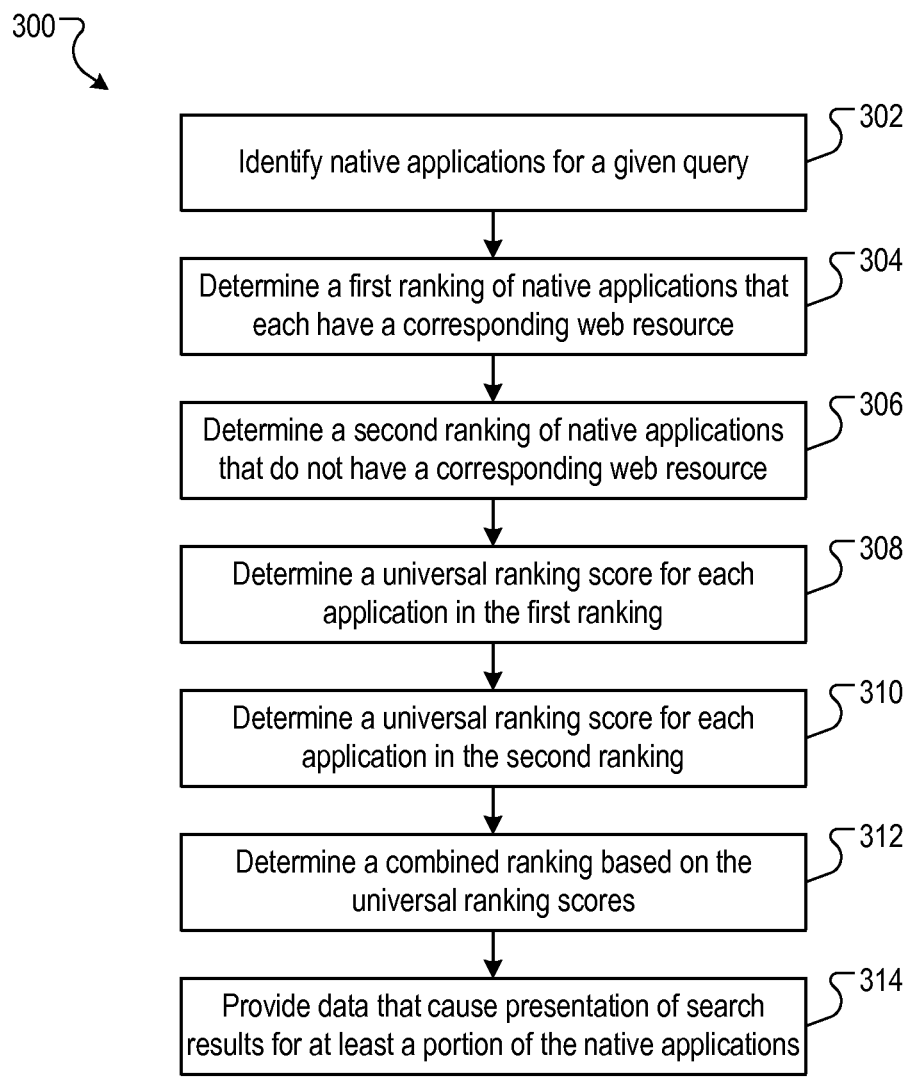
FIG. 3 is a flow diagram of an example process of ranking native applications and web resources.

FIG. 2 is a system flow diagram 200 of ranking native applications that do not have corresponding web resources with web resources and native applications that do have corresponding web resources. The system flow diagram 200 is described with reference to FIG. 3, which is a flow diagram of an example process 300 of ranking native applications and web resources. Operations of the process 300 can be implemented, for example, by a data processing apparatus, such as the search engine 130 of FIG. 1. The process 300 can also be implemented by instructions stored on computer storage medium, where execution of the instructions by a data processing apparatus cause the data processing apparatus to perform the operations of the process 300.

Native applications (and optionally web resources) are identified for a given query (302). For example, a search engine (e.g., the search engine 130 of FIG. 1) may receive a search query from a user device. In response to the query, the search engine identifies native applications and web resources that are relevant to the query. The relevancy of a native application or web resource to a query can be determined based on terms of the query and content of the native application or web resource, and multiple other signals as well. Application pages of the native applications can also be identified for the given query, for example, based on the relevancy of content of the application pages to the given query.

The identified native applications may include native applications that have a corresponding web resource and native applications that do not have a corresponding web resource. For example, the search engine may identify a first set 210 of native applications (and/or application pages of the native applications) that have a corresponding web resource by searching a web index (e.g., the web index 117 of FIG. 1). The search engine may also identify web resources that are relevant to the query by searching the web index. The search engine may identify a second set 220 of native applications (and/or application pages of the native applications) that do not have a corresponding web resource by searching an application index (e.g., the application index 119 of FIG. 1).

A first ranking, also referred to as a web ranking, of native applications (and/or application pages of the native applications) that each have a corresponding web resource is determined (304). For example, the web ranker engine 132 may rank the native applications 111, in whole or in part, based on a web scores for the native applications. The web score for each native application may be based on data regarding the native application and data regarding its corresponding web resource. For example, the data regarding the native application may include a relevancy score that indicates how relevant the content of the native application is to the query. The data regarding the native application may also include data regarding the performance of the native application, e.g., the number of times the native application has been downloaded and/or installed, application usage information, ratings data, user review data, recency data describing how recent the native application was released, and/or other appropriate application related data.

The data regarding the web resource may include a relevancy score that indicates how relevant the content of the web resource is to the query. The data regarding the web resource may also include data describing a number and quality of links to the web resource, the quality of the web resource and/or its domain, and/or other appropriate web resource data. In some implementations, the native applications that have a corresponding web resource may be ranked based on the web resource data independent of the application data. The web score for an application page may be based on the relevancy of the content of the application page and/or its corresponding web resource to the query.

A second ranking of native applications (and/or application pages of the native applications) that do not have a corresponding web resource is determined (306). For example, the application ranker engine 134 may rank the native applications of the second set 220 based on application scores for the native applications. The application score for a native application may be based on data regarding the native application. The data regarding the native application may include a relevancy score that indicates how relevant the content of the native application is to the query and/or data regarding the performance of the native application. The data regarding the performance of the native application can include, for example, the number of times the native application has been downloaded and/or installed, application usage information, ratings data, user review data, recency data describing how recent the native application was released, and/or other appropriate application related data. The application score for an application page may be based on the relevancy of the content of the application page to the query.

A universal ranking score is determined for each native application and/or application page included in the web ranking, and, optionally, web resources included in the web ranking (308). For example, the rank combiner 136 may determine the universal ranking score for the native applications, application pages, and/or web resources included in the web ranking. The universal ranking score for a native application/web resource/application page may be based on (i) its position in the web ranking and/or (ii) the total number of native applications, web resources, and/or application pages that are included in the web ranking. For example, the universal ranking score for a native application, web resource, or application page may be determined using Equation 1 below:

$$\text{Universal Ranking Score} = \frac{n - k - m}{n} \quad (1)$$

In Equation 1, "n" is the total number of native applications, web resources, and/or application pages in the web ranking, "k" is the position of the native application, web resource, or application page being scored in the web ranking, and "m" is a constant. For example, "m" may have a value of one or approximately one. With respect to FIG. 2, for the first set of native applications, n may be the cardinality of the set 210 for the native applications having corresponding web resources and that meet a minimum relevancy threshold. Alternatively, when a universal score is also being generated for the web resources, n may be the cardinality of the first set 210 and the web resources that meet a minimum relevancy score. For the second set 220, n may be the cardinality of the set 220 for the native applications having no corresponding web resources and that meet a minimum relevancy threshold.

In general, the smaller the value of n for a set, the more quickly the universal ranking will decrease. This is indicative of the overall quality of the set. For example, universal ranking scores for a set with only four native applications will die off more quickly than universal ranking scores for a set with 100 native applications.

To illustrate Equation 1, consider, for example, that Native Application A in the first set 210 is ranked third out of ten total native applications/web resources/application pages in a first ranking and that a Native Application B in the second set 220 is ranked third out of seven total native applications/web resources/application pages in a second ranking different from the first ranking. In this example, the universal ranking score for Native Application A would be $$\left(\frac{10-3+1}{10}\right) = 0.8.$$

Similarly, the universal ranking score for Native Application B would be $$\left(\frac{7-3+1}{7}\right) = 0.71.$$

In a combined ranking, Native Application A would be ranked higher than Native Application B due to Native Application A having a higher universal ranking score.

In some implementations, the universal ranking score for a particular native application, web resource, or application page is based on a Fibonacci number (or an inverse of the Fibonacci number) that corresponds to position of the native application, web resource, or application page in the web ranking. For example, the universal score for a particular native application, web resource, or application page may be determined using Equation 2 below:

$$\text{Universal Score} = \frac{\text{Inv}(Fib(k))}{\Sigma_i^n \text{Inv}(Fib(i))} \quad (2)$$

In Equation 2, "Fib(k)" is the Fibonacci number that corresponds to the position of the native application/web resource/application page in the web ranking, "Inv(Fib(k))" is the inverse of the Fibonacci number $$\left(\text{e.g., } \frac{1}{Fib(k)}\right),$$

and "n" is the total number of native applications web resources, and application pages ranked in the web ranking.

In this example, the universal ranking score for a first application that is ranked second out of three native applications/web resources/application pages would be 0.4 as Fib(2)=1

$$\text{Inv}(Fib(2)) = \frac{1}{1} = 1,$$

and the sum of the inverses for the three total native applications/web resources/application pages=1+1+0.5=2.5. Thus, the universal ranking score is $$\frac{1}{2.5} = 0.4.$$

Similarly, the universal ranking score for a native application, web resource or application page ranked third out of three would be $$\frac{0.5}{2.5} = 0.2.$$

In this example, the native application/web resource/application page having the highest score would be ranked the highest.

In some implementations, the universal ranking score is also based on the performance of search results for the native application/web resource/application page. For example, the universal ranking score may be equal to, or proportional to, a click-through rate for the search results.

A universal ranking score is determined for each native application (and/or application page) included in the application ranking (310). For example, the rank combiner 136 may determine the universal ranking score for the native applications included in the web ranking. The universal ranking score for the native applications in the application ranking may be determined in a similar manner as the universal ranking score for the native applications and web resources in the web ranking. For example, the universal ranking score for a particular native application or application page in the application ranking may be determined based on (i) its position in the application ranking and/or (ii) the total number of native applications and application pages that are included in the application ranking. In particular, the universal ranking score for a particular native application may be determined using Equations 1 or 2 above using the total number of native applications in the application ranking as the value of "k".

In some implementations, the universal ranking score for the native applications and application pages in the application ranking is based on the performance of search results for the native applications and application pages. For example, the universal ranking score may be equal to, or proportional to, a click-through rate for the search results.

The universal ranking scores for the native applications/web resources/application pages in the web ranking and the universal ranking scores for the native applications/application pages in the application ranking may be determined using the same process or equation so that the rankings can be combined using the universal ranking scores. Or, different processes or equations can be used for the native applications/web resources/application pages in the rankings.

A combined ranking is determined based on the universal ranking scores (312). For example, the rank combiner 136 may generate a combined ranking that includes native applications, web resources, and/or application pages from the web ranking and native applications and/or application pages from the application ranking. The native applications, web resources, and/or application pages may be ordered in the combined ranking based on the universal ranking scores. The native application, web resource, or application page having the highest universal ranking score may be ranked the highest in the combined ranking irrespective of the ranking (e.g., web ranking or application ranking) in which the native application/web resource/application page was first ranked.

In some implementations, a weighting is applied to the universal ranking scores based on the ranking in which the native applications, web resources, and application pages were first ranked. For example, a search provider may want to boost search results for native applications that have corresponding web resources relative to native applications that do not have corresponding web resources. In this example, the universal ranking scores for native applications that were ranked in the web ranking may be weighted more than the universal ranking scores for native applications that were ranked in the application ranking. In particular, the universal ranking scores for native applications that were ranked in the web ranking may be multiplied by a factor (e.g., 1.1) while the universal ranking scores for the native applications that were ranked in the application ranking are not adjusted or multiplied by a lower factor (e.g., 0.9).

An example of combining a web ranking with an application ranking is shown below with reference to Tables 1-3. Table 1 shows a web ranking of native applications that have a corresponding web resource and other web resources for a given query. Table 2 shows an application ranking of native applications that do not have a corresponding web resource. Table 3 shows a combined ranking based on the web ranking of Table 1 and the application ranking of Table 2.

TABLE 1

Web Ranking

| Native Application/Web Resource | Rank |
|---|---|
| NativeApplication$_6$ | 1 |
| NativeApplication$_{171}$ | 2 |
| WebResource$_{35}$ | 3 |
| NativeApplication$_{79}$ | 4 |
| WebResource$_{21}$ | 5 |

TABLE 2

Application Ranking

| Native Application | Rank |
|---|---|
| NativeApplication$_{24}$ | 1 |
| NativeApplication$_{101}$ | 2 |
| NativeApplication$_{33}$ | 3 |

A universal ranking score can be determined for each web resource and native application included in the web ranking of Table 1 using Equation 1, Equation 2, or the performance of search results for the native applications/web resources, as described above. score is based on Equation 1 above. Thus, the universal ranking score for first ranked NativeApplication$_6$ is $$\frac{5-1+1}{5} = 1.00;$$

the universal ranking score for second ranked NativeApplication$_{171}$ is $$\frac{5-2+1}{5} = 0.8,$$

and so on.

Similarly, a universal ranking score can be determined for each native application included in the application ranking of Table 2 using Equation 1, Equation 2, or the performance of search results for the native applications, as described above. In this example, the universal ranking score is based on Equation 1 above. Thus, the universal ranking score for first ranked NativeApplication$_{24}$ is $$\frac{3-1+1}{3} = 1.00;$$

the universal ranking score for second ranked NativeApplication$_{101}$ is $$\frac{3-2+1}{3} = 0.67;$$

and the universal ranking score for third ranked NativeApplication$_{33}$ is $$\frac{3-3+1}{3} = 0.33.$$

The web ranking and application ranking can be combined into the combined ranking of Table 3 based on the universal ranking scores. For example, as shown in Table 3, the native applications and web resources are ranked in descending order based on the universal ranking scores.

TABLE 3

Combined Ranking

| Native Application/Web Resource | Rank | Universal Ranking Score |
|---|---|---|
| NativeApplication$_6$ | 1a | 1.00 |
| NativeApplication$_{24}$ | 1b | 1.00 |
| NativeApplication$_{171}$ | 3 | 0.80 |
| NativeApplication$_{101}$ | 4 | 0.67 |
| WebResource$_{35}$ | 5 | 0.60 |
| NativeApplication$_{79}$ | 6 | 0.40 |
| NativeApplication$_{33}$ | 7 | 0.33 |
| WebResource$_{21}$ | 8 | 0.20 |

In some implementations, ties between universal ranking scores can be resolved by one or more tie breaking rules. For example, ties can be resolved by selecting a native application with a corresponding web resource over a native application that does not have a corresponding web resource; or relative popularity between the tied native applications can be used (e.g., the native application with the most downloads may be selected), etc.

Data that cause presentation of search results for at least a portion of the native applications, web resources, and application pages is provided to the user device from which the query was received (314). For example, the search engine may generate search results for a portion of the top ranked native applications/web resources and provide the search results to the user device. The data may cause the search results to be provided on a search results page, e.g., similar to the search results page shown in FIG. 4 and described below.

If a user interacts with a search result, the interaction may cause the user device to perform a particular action. For example, if the user selects a search result that links to a web resource, the user device may navigate to the web resource and present the web resource to the user, e.g., using a web browser. If the user selects a search result that links to an application page of a native application, the user device may launch the native application and cause the native application to present the application page. If the user selects a search result that links to a native application, the user device may launch the native application.

Figure 4:
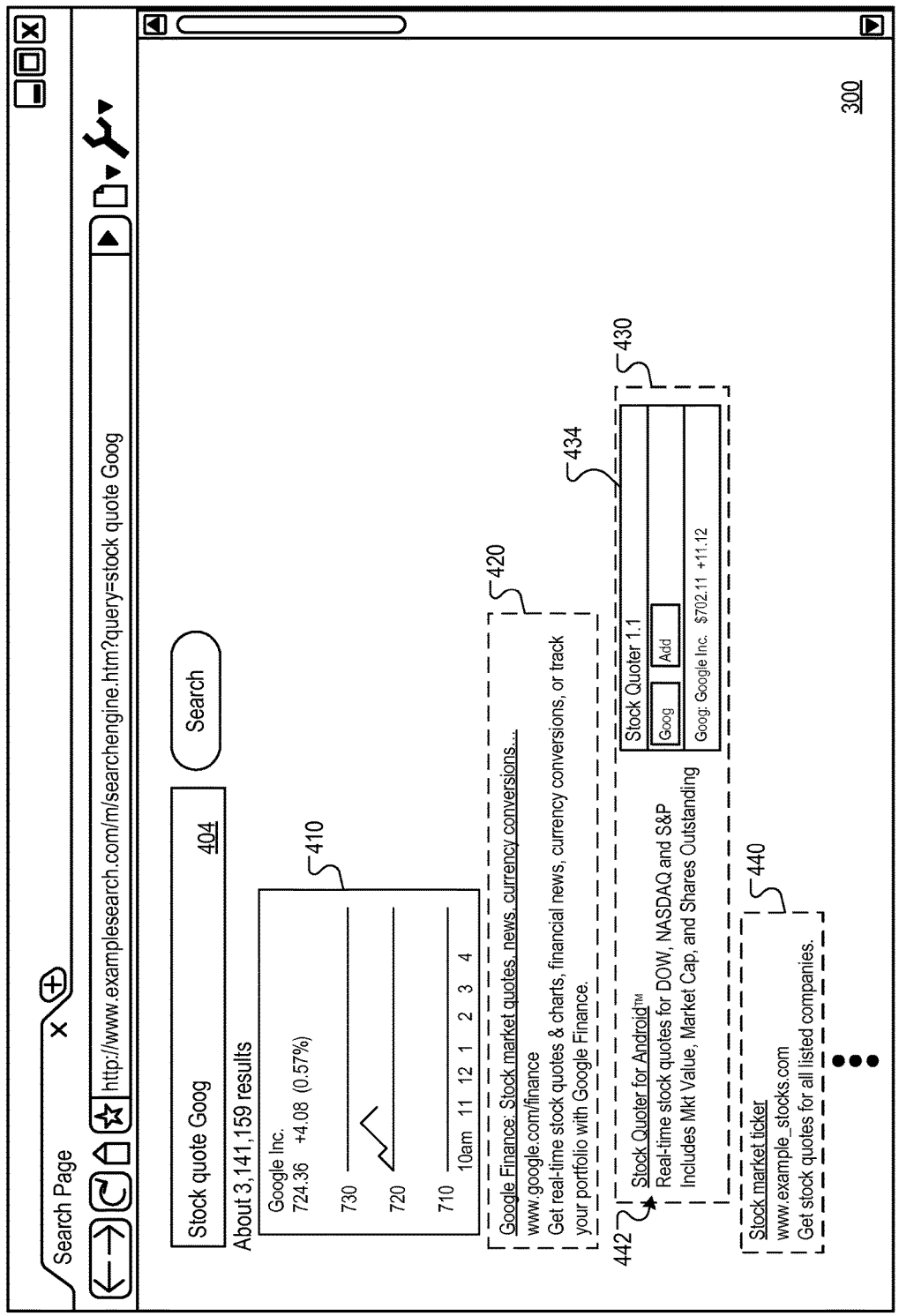
FIG. 4 is an illustration of a search results page including a native application search result.

FIG. 4 is an illustration of a search results page 400 including a native application search result. Displayed in the search results page 400 are search results 410, 420, 430, and 440 that are responsive to the query "Stock quote Goog" displayed in the search input field 404. The search result 410 is a real time search result that is generated, for example, in part from a real time feed. The search results 420 and 440 are web search results generated in response to a search of a web index 112 of resources. Each search result 420 and 440 references a resource that can be rendered in a browser application on a user device and includes a link to the resource, and other data, such as a snippet of text extracted for the referenced resource.

The search result 430 is a native application search result that is generated in response to a search of the application index 119 of native applications and/or application pages. The search result 430 may include, for example, a snippet 432 of text and an image 434 of an application page. The snippet 434 may include, for example, the name of the native application (Stock Quoter for Andriod™) and text that has been extracted from one or more application pages of the native application. Additional text can also be included, such as text from metadata.

The image 434 may be, for example, an image of a rendered application page. In some implementations, multiple images for a particular application page may be stored, and the image that is most relevant to the query may be selected. For example, as show in FIG. 4 the image 434 includes an image for a stock quote for the Goog symbol, and the image is selected because the search query specifies the Goog symbol.

In some implementations, selection of the image 434 at the user device causes the native application to launch and generate an instance of the application page that includes content that is relevant to the search query. For example, provided the native application Stock Quoter for Andriod™ is installed on the user device, selecting the image 434 causes the native application to launch and generate the application page that corresponds to the image 434. Furthermore, the application page is rendered to display the current stock quote for the Goog symbol. This can be accomplished, for example, by passing the input value of Goog in a command line for the native application. If, on the other hand, the native application is not installed, then selection of the image 434 may cause the user device 108 to display a web page resource at which the particular native application may be downloaded and installed on the user device 108.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   determining, for a given query, a first ranking of a set of first native applications that each have a respective corresponding web resource and that are relevant to the given query, wherein each first native application is ranked in the first ranking based on a combination of (i) content of the first native application and (ii) content of the respective corresponding web resource for the first native application, the corresponding web resource for each first native application being a resource that can be rendered in a browser application that is a separate application from the first native application and including content that corresponds to the content displayed in the first native application;

determining, for each particular first native application in the first ranking, a first universal ranking score based on a position of the particular first native application in the first ranking and a total number of first native applications in the first ranking;

determining, for the given query, a second ranking of a set of second native applications that do not have a corresponding web resource and that are relevant to the given query, wherein each second native application is ranked in the second ranking based on content of the second native application;

determining, for each particular second native application, a second universal ranking score based on a position of the particular second native application in the second ranking and a total number of second native applications in the second ranking;

determining a combined ranking of the first native applications and the second native applications based on the first universal ranking scores and the second universal ranking scores; and generating and providing, to a user device from which the given query was received, data that causes:
the user device to present search results for at least a portion of the first native applications and the second native applications in an order based on the combined ranking, wherein at least a portion of the search results includes content obtained from a native application referenced by the search result and a link to a particular location within the native application; and
the user device to: (i) launch a given native application referenced by a given search result when the given search result is selected and (ii) cause the given native application to present content at the particular location within the given native application.

2. The method of claim 1, wherein determining the first universal ranking score for a particular first native application comprises:
determining a first value based on a difference between the total number of first native applications in the first ranking and the position of the particular first native application in the first ranking; and
determining a ratio between (i) a sum of the first value and a second value and (ii) the total number of first native applications in the first ranking.

3. The method of claim 1, wherein the first ranking includes at least one web resource that is relevant to the given query.

4. The method of claim 2, wherein the second value is approximately one.

5. The method of claim 1, wherein the first ranking of the set of first native applications comprises one or more application pages of one or more of the first applications.

6. The method of claim 1, wherein determining the first universal ranking score for a particular first native application comprises:
identifying, for the particular first native application, a Fibonacci number that corresponds to the position of the particular first native application in the first ranking; and
determining an inverse of the Fibonacci number for the particular first native application.

7. The method of claim 1, wherein the second ranking of the set of second native applications comprises one or more application pages of one or more of the second native applications.

8. The method of claim 6, wherein determining the first universal ranking score for a particular first native application comprises:
identifying, for each first native application in the first ranking, a Fibonacci number that corresponds to the position of the first native application in the first ranking;
determining, for each first native application in the first ranking, an inverse of the Fibonacci number that corresponds to the position of the first native application in the first ranking;
determining a sum of the inverse for each first native application in the first ranking; and
determining a ratio between (i) the inverse of the Fibonacci number for the particular first native application and (ii) the sum of the inverse for each first native application in the first ranking.

9. The method of claim 1, further comprising identifying, based on the given query, the first native application from a first search index that includes data that identify native applications that have a corresponding web page, each first native application being ranked based on data regarding the web page that corresponds to the first native application.

10. The method of claim 9, further comprising identifying, based on the given query, the second native applications from a second search index that includes data that identify native applications that do not have a corresponding web page.

11. A system comprising:
a data processing apparatus; and
a computer storage medium encoded with a computer program, the program comprising data processing apparatus instructions that when executed by the data processing apparatus cause the data processing apparatus to perform operations comprising:
determining, for a given query, a first ranking of a set of first native applications that each have a respective corresponding web resource and that are relevant to the given query, wherein each first native application is ranked in the first ranking based on a combination of (i) content of the first native application and (ii) content of the respective corresponding web resource for the first native application, the corresponding web resource for each first native application being a resource that can be rendered in a browser application that is a separate application from the first native application and including content that corresponds to the content displayed in the first native application;

determining, for each particular first native application in the first ranking, a first universal ranking score based on a position of the particular first native application in the first ranking and a total number of first native applications in the first ranking;

determining, for the given query, a second ranking of a set of second native applications that do not have a corresponding web resource and that are relevant to the given query, wherein each second native application is ranked in the second ranking based on content of the second native application;

determining, for each particular second native application, a second universal ranking score based on a position of the particular second native application in the second ranking and a total number of second native applications in the second ranking;

determining a combined ranking of the first native applications and the second native applications based on the first universal ranking scores and the second universal ranking scores; and generating and providing, to a user device from which the given query was received, data that causes:
the user device to present search results for at least a portion of the first native applications and the second native applications in an order based on the combined ranking, wherein at least a portion of the search results includes content obtained from a native application referenced by the search result and a link to a particular location within the native application; and the user device to: (i) launch a given native application referenced by a given search result when the given search result is selected and (ii) cause the given native application to present content at the particular location within the given native application.

12. The system of claim 11, wherein determining the first universal ranking score for a particular first native application comprises:
determining a first value based on a difference between the total number of first native applications in the first ranking and the position of the particular first native application in the first ranking; and
determining a ratio between (i) a sum of the first value and a second value and (ii) the total number of first native applications in the first ranking.

13. The system of claim 11, wherein determining the first universal ranking score for a particular first native application comprises:
identifying, for the particular first native application, a Fibonacci number that corresponds to the position of the particular first native application in the first ranking; and
determining an inverse of the Fibonacci number for the particular first native application.

14. The system of claim 11, wherein the first ranking of the set of first native applications comprises one or more application pages of one or more of the first applications.

15. The system of claim 13, wherein determining the first universal ranking score for a particular first native application comprises:
identifying, for each first native application in the first ranking, a Fibonacci number that corresponds to the position of the first native application in the first ranking;
determining, for each first native application in the first ranking, an inverse of the Fibonacci number that corresponds to the position of the first native application in the first ranking;
determining a sum of the inverse for each first native application in the first ranking; and
determining a ratio between (i) the inverse of the Fibonacci number for the particular first native application and (ii) the sum of the inverse for each first native application in the first ranking.

16. The system of claim 11, wherein the second ranking of the set of second native applications comprises one or more application pages of one or more of the second native applications.

17. The system of claim 11, wherein the operations further comprise identifying, based on the given query, the first native application from a first search index that includes data that identify native applications that have a corresponding web page, each first native application being ranked based on data regarding the web page that corresponds to the first native application.

18. The system of claim 17, wherein the operations further comprise identifying, based on the given query, the second native applications from a second search index that includes data that identify native applications that do not have a corresponding web page.

19. The system of claim 11, wherein the first ranking includes at least one web resource that is relevant to the given query.

20. A non-transitory computer storage medium encoded with a computer program, the program comprising instructions that when executed by one or more data processing apparatus cause the data processing apparatus to perform operations comprising:
determining, for a given query, a first ranking of a set of first native applications that each have a respective corresponding web resource and that are relevant to the given query, wherein each first native application is ranked in the first ranking based on a combination of (i) content of the first native application and (ii) content of the respective corresponding web resource for the first native application, the corresponding web resource for each first native application being a resource that can be rendered in a browser application that is a separate application from the first native application and including content that corresponds to the content displayed in the first native application;

determining, for each particular first native application in the first ranking, a first universal ranking score based on a position of the particular first native application in the first ranking and a total number of first native applications in the first ranking;

determining, for the given query, a second ranking of a set of second native applications that do not have a corresponding web resource and that are relevant to the given query, wherein each second native application is ranked in the second ranking based on content of the second native application;

determining, for each particular second native application, a second universal ranking score based on a position of the particular second native application in the second ranking and a total number of second native applications in the second ranking;

determining a combined ranking of the first native applications and the second native applications based on the first universal ranking scores and the second universal ranking scores; and generating and providing, to a user device from which the given query was received, data that causes:
the user device to present search results for at least a portion of the first native applications and the second native applications in an order based on the combined ranking, wherein at least a portion of the search results includes content obtained from a native application referenced by the search result and a link to a particular location within the native application; and the user device to: (i) launch a given native application referenced by a given search result when the given search result is selected and (ii) cause the given native application to present content at the particular location within the given native application.

* * * * *

UNITED STATES PATENT AND TRADEMARK OFFICE
CERTIFICATE OF CORRECTION

PATENT NO. : 10,268,732 B2
APPLICATION NO. : 14/753350
DATED : April 23, 2019
INVENTOR(S) : Dong Ha Lee et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 500 days.

Signed and Sealed this
Nineteenth Day of May, 2020

Andrei Iancu
*Director of the United States Patent and Trademark Office*